United States Patent [19]

Vofsi et al.

[11] 3,867,468

[45] Feb. 18, 1975

[54] PRODUCTION OF DIBROMOSTYRENE AND ALKYL BROMIDE

[75] Inventors: David Vofsi; Moshe Levy; Stephen Daren, all of Rehovot; Ella Cohen, Tel-Aviv, all of Israel

[73] Assignee: Yeda Research and Development Co., Ltd., Rehovot, Israel

[22] Filed: June 12, 1972

[21] Appl. No.: 262,096

[30] Foreign Application Priority Data
June 25, 1971 Israel.................................... 37149

[52] U.S. Cl. .......................... 260/650 R, 260/652 R
[51] Int. Cl............................................ C07c 25/28
[58] Field of Search ...................... 260/650 R, 652 R

[56] References Cited
UNITED STATES PATENTS

| | | | |
|---|---|---|---|
| 2,443,217 | 6/1948 | Amos et al................. | 260/650 R X |
| 2,519,125 | 8/1950 | Erickson.......................... | 260/650 R |
| 2,569,131 | 9/1951 | Markarian................... | 260/650 R X |
| 2,643,270 | 6/1953 | Ross.............................. | 260/650 R |
| 3,737,469 | 6/1973 | Berger et al. ............... | 260/652 R X |

FOREIGN PATENTS OR APPLICATIONS 986,634   3/1965   Great Britain.................. 260/650 R

OTHER PUBLICATIONS

Cubbon et al., Polymer, 10, 479–487, 1969.

Primary Examiner—Howard T. Mars
Attorney, Agent, or Firm—Hubbell, Cohen & Stiefel

[57] ABSTRACT

A process for the simultaneous production of dibromostyrene and an alkyl bromide, which comprises reacting bromoethyl dibromobenzene and an alkanol at a temperature of 300° to 550°C. With α-bromoethyl dibromobenzene the reaction is advantageously effected by contacting the reactants with a mixture of molten alkali metal bromides or alkaline earth bromides at 300° to 500°C, whereas with β-bromoethyl dibromobenzene there is advantageously effected a pyrolysis reaction at 400–500°C.

5 Claims, No Drawings

PRODUCTION OF DIBROMOSTYRENE AND ALKYL BROMIDE

BACKGROUND OF THE INVENTION

In U.S. patent application Ser. No. 200,239, now U.S. Pat. No. 3,737,469, there is described and claimed a novel process for the production of bromostyrene and an alkyl bromide, which comprises contacting alpha- or beta-bromoethyl bromobenzene and an alkanol with a molten alkali metal or alkaline earth bromide at a temperature in the range of between about 250°–500°C, resulting in the desired products.

Dibromostyrene is a very reactive monomer which can be readily polymerized. The main use of this compound is in its copolymerization with other monomers, to produce copolymers, and its incorporation in polyester resins so as to result in products which are self-extinguishing.

The synthesis of dibromostyrene has been described in British Pat. No. 986,634 and also in the technical literature, such as for example in Polymer (1969), 479. It is known to produce dibromostyrene by reacting a mixture of alpha-bromoethyl dibromobenzene with calcium sulfate at 300°C, or by passing this compound over $Al_2O_3$ at about 280°C. The dehydrobromination is reported to be complete, but no yields are given.

The main advantage of the process described and claimed in the aforesaid patent that the catalyst, namely the mixture of molten bromides, is not poisoned, and any carbonaceous heavy products formed float on the molten salts and can be easily removed.

The boiling point of alpha-bromoethyl dibromobenzene is higher than that of the corresponding monobromo derivative, and it would be expected that this might result in considerable decomposition if the reaction would be carried out in a manner similar to that of the mono-bromo derivative.

SUMMARY OF THE PRESENT INVENTION

The present invention relates to a process for the simultaneous production of dibromostyrene and an alkyl bromide, which comprises reacting bromoethyl dibromobenzene and an alkanol at a temperature of 300° to 550°C. With $\alpha$-bromoethyl dibromobenzene the reaction is advantageously effected by contacting the reactants with a mixture of molten alkali metal bromides or alkaline earth bromides at 300° to 500°C, whereas with $\beta$-bromoethyl dibromobenzene there is advantageously effected a pyrolysis reaction at 400° to 550°C.

The process according to the present invention is surprising, as it was to be expected that a reaction as used in this process would result in considerable decomposition and in the formation of undesired by-products. This is not so, and when suitable conditions of reaction are chosen, as will be defined hereinafter, it is possible to obtain the desired dibromostyrene in high yields, at a high degree of purity and with very small quantities of by-products. There occur but very small losses due to decomposition.

The process is similar to that of the aforesaid patent and it comprises reacting bromoethyl dibromobenzene and an alkanol at an elevated temperature, to simultaneously produce dibromostyrene and an alkyl bromide corresponding to the alkanol used.

The process according to the present invention comprises either contacting the above defined reactants with a molten mixture of alkali metal or alkaline earth bromides at an elevated temperature in the range of about 250°–500°C or in subjecting the above defined reactants to a pyrolysis reaction at an elevated temperature, at a temperature of about 400°–550°C.

It is very desirable that the reactants be heated but briefly prior to their introduction into the reaction zone, and that the products of reaction be removed quickly and quenched so as to avoid the polymerization of the reactive product, dibromostyrene.

The alkanol acts as acceptor, or scavenger, of the hydrogen halide which is liberated during the reaction of the substrate (bromoethyl dibromobenzene) and it is believed that the fast reaction of the alkanol with the hydrogen halide has a pronounced beneficial effect on the yield of the desired products. It is known that the elimination of the hydrogen halide from the substrate is a reversible reaction, and when this reaction is carried out in the presence of an acceptor for the hydrogen halide the equilibrium is shifted in the direction of the product. The reaction is more selective and it is believed that this is also due to the rapid removal of the hydrogen halide which is known to polymerize vinylic monomers, resulting in oligomeric products, which are highly undesirable by-products of reactions of this kind.

The reaction with the alkanol results in the production of alkyl bromides, which are valuable products.

The process according to the present invention is applicable both to $\alpha$-bromoethyl dibromobenzene and to $\beta$-bromoethyl dibromobenzene.

The version of the process making use of molten salts gives better results with $\alpha$-bromoethyl dibromobenzene, while the pyrolysis process gives better results when the substrate is $\beta$-bromoethyl dibromobenzene. The pyrolysis process has the further advantage that the product, dibromostyrene, is obtained at a high degree of purity, and substantially without admixture of saturated products, such as ethyl bromobenzenes, which are produced as by-products employing the known processes and which, due to the fact that their boiling points are very close to that of the product, are only separated with difficulty therefrom.

It is advantageous to carry out the reaction in an inert atmosphere, such as, for example, under nitrogen, or to reduce the pressure, resulting in an increased volatility of the reactants and reaction products.

DESCRIPTION OF THE PREFERRED EMBODIMENTS

The following examples are intended to illustrate the invention, and these are to be construed in a non-limitative manner.

EXAMPLE 1

The reaction flask consisted of a glass tube containing the molten salts. The reaction mixture was forced to the bottom of the tube through a narrow inner tube. It then bubbled through the molten salts and exited through another narrow tube leading to a trap. A mixture of 100 g LiBr, 90 g KBr and 30 g $CaBr_2$ were melted in the reaction flask. 34g $\alpha$-bromoethyl dibromobenzene and 20 mg methanol were introduced by two automatic syringes into a narrow mixing chamber which was connected to the inlet of the reactor. The overall rate of addition of the mixed components was 5 cc/hour. Nitrogen was also bubbled through the salts as a carrier gas. The effluent gaseous mixture was passed through a trap cooled in ice to collect the high boiling products, while the methyl bromide was collected in liquid air. Water was added to the high boiling fraction and the organic phase was collected and submitted to fractional distillation in vacuum. The fraction distilling at 58° to 62°C at 0.05 mm Hg pressure was collected. It was analyzed by gas chromatography and it consisted of a major peak of 2,4 dibromostyrene and two small peaks (about 10 percent) of 2,5 and 3,4 dibromostyrene. The yield of dibromostyrene was 23.5 g (90 percent). The yield of methyl bromide was 8 gr.

EXAMPLE 2

A run was carried out as in Example 1, but instead of nitrogen as a carrier gas, a partial pressure of 100 mm of Hg was maintained throughout the reaction. The product obtained in this manner was clear and had only a slight yellow tinge. The yield was 24 g (92 percent) of distilled dibromostyrene.

EXAMPLE 3

A reactor was prepared consisting of a glass spiral of 6 mm internal diameter, of 3 meter length, which was connected to a tube 30 mm diameter and 25 cm long. The reactor tube was maintained at a temperature in the range of from 490°–500°C. A quantity of 170 g of β-bromoethyl dibromobenzene (a mixture of the ortho and para isomers) was introduced into the reactor at a steady rate of 20 grams per hour by a motor-driven syringe, together with methanol at a rate of 4.4 grams per hour and with preheated nitrogen at the rate of 2 liters per hour. The nitrogen was preheated to 300°C.

The liquid products were collected in a trap submerged in an ice bath while the methyl bromide was trapped in a receptacle cooled in liquid nitrogen. The products were subject to vacuum distillation and these were found to consist of 14 g unconverted substrate, 108 g dibromostyrene (a yield of 91 percent) and the corresponding quantity of methyl bromide.

The above examples are illustrative only and are to be construed in a non-limitative sense.

We claim:

1. A process for the simultaneous production of dibromostyrene and a $C_1$—$C_4$ alkyl bromide, which comprises subjecting β-bromoethyl dibromobenzene and a $C_1$—$C_4$ alkanol to a pyrolysis reaction at a temperature of from 400° to 550° C. by passage through an empty tube.

2. A process as claimed in claim 1, wherein the alkanol is methanol and the alkyl bromide is methyl bromide.

3. A process as claimed in claim 1, wherein a carrier gas is admixed with the reactants.

4. A process as claimed in claim 3, wherein the carrier gas is nitrogen.

5. A process as claimed in claim 1, wherein the products are rapidly cooled after emerging from the reaction zone.

* * * * *

PO-1050
(5/69)

UNITED STATES PATENT OFFICE
CERTIFICATE OF CORRECTION

Patent No. 3,867,468           Dated  February 18, 1975

Inventor(s) DAVID VOFSI et al

It is certified that error appears in the above-identified patent and that said Letters Patent are hereby corrected as shown below:

Title page, right column, line 10 of the Abstract: "400-500°C." should read -- 400-550°C. --.

Column 1, line 29: "patent that" should read -- patent is that --.

Signed and sealed this 24th day of June 1975.

(SEAL)
Attest:

RUTH C. MASON
Attesting Officer

C. MARSHALL DANN
Commissioner of Patents
and Trademarks